US012628225B2

(12) United States Patent
Liu et al.

(10) Patent No.: US 12,628,225 B2
(45) Date of Patent: May 12, 2026

(54) DATA PROCESSING METHOD AND TERMINAL

(71) Applicant: GUANGDONG OPPO MOBILE TELECOMMUNICATIONS CORP., LTD., Dongguan (CN)

(72) Inventors: Wei Liu, Dongguan (CN); Hao Peng, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 452 days.

(21) Appl. No.: 18/309,286

(22) Filed: Apr. 28, 2023

(65) Prior Publication Data

US 2023/0262810 A1 Aug. 17, 2023

Related U.S. Application Data

(63) Continuation of application No. PCT/CN2021/115451, filed on Aug. 30, 2021.

(30) Foreign Application Priority Data

Nov. 13, 2020 (CN) .......................... 202011272708.4

(51) Int. Cl.
| | |
|---|---|
| *H04W 76/15* | (2018.01) |
| *H04W 72/1263* | (2023.01) |
| *H04W 80/06* | (2009.01) |

(52) U.S. Cl.
CPC ....... *H04W 76/15* (2018.02); *H04W 72/1263* (2013.01); *H04W 80/06* (2013.01)

(58) Field of Classification Search
CPC ............. H04W 76/15; H04W 72/1263; H04W 80/06
See application file for complete search history.

(56) References Cited

U.S. PATENT DOCUMENTS

| | | | |
|---|---|---|---|
| 7,769,888 B2* | 8/2010 | Flammer ................ H04L 45/22 |
| | | | 709/239 |
| 10,389,541 B1 | 8/2019 | Patro | |
| 2015/0237525 A1* | 8/2015 | Mildh .............. H04W 28/0236 |
| | | | 370/230.1 |

(Continued)

FOREIGN PATENT DOCUMENTS

| | | |
|---|---|---|
| CN | 107147619 A | 9/2017 |
| CN | 108449771 A | 8/2018 |

(Continued)

OTHER PUBLICATIONS

Chinese First Office Action, Chinese Application No. 202011272708.4, mailed Jan. 24, 2022 (14 pages).

(Continued)

*Primary Examiner* — Saad A. Waqas

(74) *Attorney, Agent, or Firm* — Ladas & Parry LLP

(57) ABSTRACT

Disclosed in the present application is a data transmission method. The data transmission method includes: establishing a multipath transmission control protocol (MPTCP) connection with a network access point device, the MPTCP connection including a first TCP connection and a second TCP connection, the first TCP connection being constructed according to a first Wi-Fi connection corresponding to a first Wi-Fi module, and the second TCP connection being constructed according to a second Wi-Fi connection corresponding to a second Wi-Fi module; and transmitting network access data to the network access point device by means of the MPTCP connection.

16 Claims, 10 Drawing Sheets

(56) References Cited

U.S. PATENT DOCUMENTS

| | | | |
|---|---|---|---|
| 2016/0112239 A1 | 4/2016 | Kanugovi et al. | |
| 2020/0260513 A1 | 8/2020 | Huang et al. | |
| 2021/0329528 A1* | 10/2021 | Kang | H04L 47/283 |

FOREIGN PATENT DOCUMENTS

| | | | | |
|---|---|---|---|---|
| CN | 109803325 A | * | 5/2019 | H04W 72/53 |
| CN | 111372329 A | | 7/2020 | |
| CN | 111416794 A | | 7/2020 | |
| CN | 112333690 A | | 2/2021 | |
| WO | WO-2015171023 A1 | * | 11/2015 | H04L 69/161 |
| WO | 2016049919 A1 | | 4/2016 | |
| WO | WO-2018156681 A1 | * | 8/2018 | H04W 40/12 |
| WO | WO-2020135457 A1 | * | 7/2020 | H04W 40/12 |

OTHER PUBLICATIONS

Notification to Grant Patent Right for Invention, Chinese Application No. 202011272708.4, mailed Jul. 5, 2022 (6 pages).

International Search Report, International Application No. PCT/CN2021/115451, mailed Aug. 30, 2021 (16 pages).

Vivo's Dual Wi-Fi Acceleration technology can connect two networks at once, dated Jul. 18, 2019 (3 pages).

European Search Report, European Patent Application No. 21890740.0, mailed Mar. 22, 2024 (9 pages).

Saha Swetank Kumar et al: "MuSher An Agile Multipath-TCP Scheduler for Dual-Band 802.11ad/ac Wireless LANs", Oct. 11, 2019; XP58456038; Publication dated Oct. 11, 2019 (16 pages).

European Examination Report, European Application No. 21890740.0, mailed Nov. 20, 2025 (6 pages).

* cited by examiner establishing a Multipath Transmission Control Protocol (MPTCP) connection with a network access point device, wherein the MPTCP connection comprises a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module — 101 transmitting network access data to the network access point device through the MPTCP connection and enabling the network access point device to transmit the network access data to a server requested to be accessed through a TCP connection — 102

FIG. 1 establishing a Multipath Transmission Control Protocol (MPTCP) connection with a network access point device, wherein the MPTCP connection comprises a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module — 111 transmitting network access data to the network access point device through the MPTCP connection and enabling the network access point device to transmit the network access data to a server requested to be accessed through a TCP connection — 112 acquiring data transmitted by the server from the network access point device through the MPTCP connection. — 113

FIG. 2 establishing a Multipath Transmission Control Protocol (MPTCP) connection with a network access point device, wherein the MPTCP connection comprises a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module _— 201_ transmitting the network access data to the network access point device by using a redundant scheduling strategy and through the MPTCP connection in response to the network access data being generated by a first type application, wherein the first type application has a requirement for high reliability, and the redundant scheduling strategy is configured to transmit the same data through the first TCP connection and the second TCP connection _— 202_ transmitting the network access data to the network access point device by using an aggregated scheduling strategy and through the MPTCP connection in response to the network access data being generated by a second type application, wherein the second type application has a requirement for high rate, and the aggregated scheduling strategy is configured to distribute data to different TCP connections for transmitting _— 203_ acquiring data transmitted by the server from the network access point device through the MPTCP connection _— 204_

FIG. 5 establishing a Multipath Transmission Control Protocol (MPTCP) connection with a terminal, wherein the MPTCP connection comprises a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device — 301 acquiring network access data from the terminal through the MPTCP connection, establishing a TCP connection with a server requested to be accessed by the network access data, and transmitting the network access data to the server through the TCP connection — 302 acquiring data to be transmitted to the terminal from the server through the TCP connection and transmitting the data to the terminal through the MPTCP connection — 303

FIG. 6 establishing a Multipath Transmission Control Protocol (MPTCP) connection between the terminal and the network access point device and transmitting data between the terminal and the network access point device through the MPTCP connection, wherein the MPTCP connection comprises a first Transmission Control Protocol (TCP) connection and a second TCP connection, the first TCP connection is constructed based on the first Wi-Fi connection between the terminal and the network access point device, and the second TCP connection is constructed based on the second Wi-Fi connection between the terminal and the network access point device — 401 establishing a TCP connection between the network access point device and the server and transmitting data between the network access point device and the server through the TCP connection — 402

FIG. 7

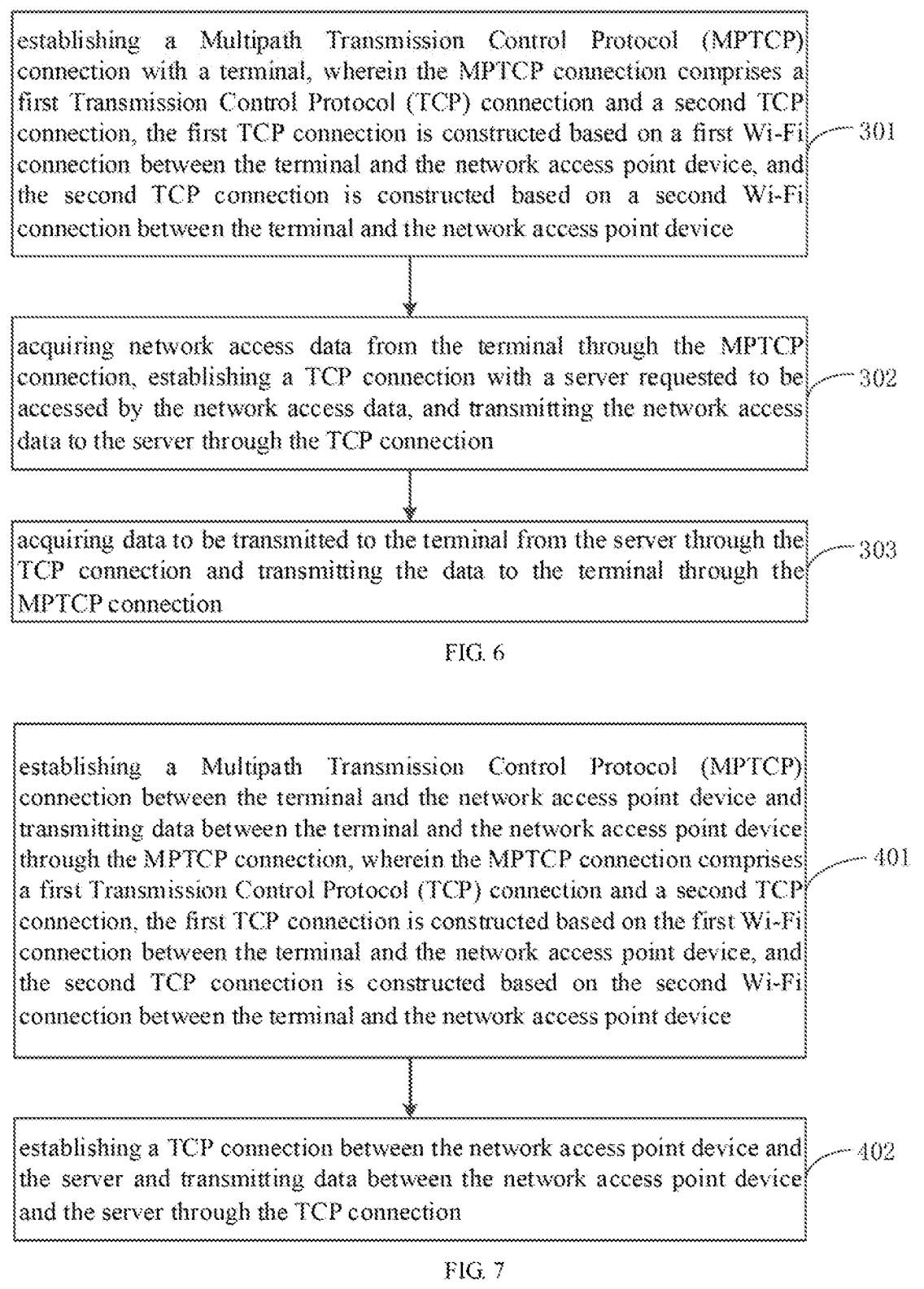

DATA PROCESSING METHOD AND TERMINAL

CROSS REFERENCE TO RELATED APPLICATIONS

The present disclosure is a continuation of International Patent Application No. PCT/CN2021/115451, filed on Aug. 30, 2021, which claims priority to Chinese Patent Application No. 202011272708.4 entitled "DATA PROCESSING METHOD AND APPARATUS, STORAGE MEDIUM, TERMINAL, AND NETWORK ACCESS POINT DEVICE", filed on Nov. 13, 2020 in the National Intellectual Property Administration of China, the content of which is herein incorporated by reference in their entireties.

TECHNICAL FIELD

The present disclosure relates to the technology field of data, in particular to a data transmission method and a terminal.

BACKGROUND

Data transmission is often required between different devices. For example, as a mobile terminal accesses a network, the mobile terminal may transmit a network access request to a network access point device, and then the network access point device may transmit the network access request of the mobile terminal to a network device such as an application server, or the like. However, the efficiency of the data transmission in the related art is still low.

SUMMARY

Some embodiments of the present disclosure provide a data transmission method, a data transmission apparatus and a terminal.

In a first aspect, some embodiments of the present disclosure provide a data transmission method performed by a terminal. The terminal including a first Wi-Fi module and a second Wi-Fi module, and the data transmission method includes: establishing a Multipath Transmission Control Protocol (MPTCP) connection with a network access point device; and transmitting network access data to the network access point device through the MPTCP connection and enabling the network access point device to transmit the network access data to a server requested to be accessed through a TCP connection. Herein, the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

In a second aspect, some embodiments of the present disclosure provide a data transmission method performed by a network access point device. The data transmission method includes: establishing a Multipath Transmission Control Protocol (MPTCP) connection with a terminal; acquiring network access data from the terminal through the MPTCP connection, establishing a TCP connection with a server requested to be accessed by the network access data, and transmitting the network access data to the server through the TCP connection; and acquiring data to be transmitted to the terminal from the server through the TCP connection and transmitting the data to the terminal through the MPTCP connection. Herein, the MPTCP connection includes a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device.

In a third aspect, some embodiments of the present disclosure provide a terminal including a memory, a processor, a first Wi-Fi module, and a second Wi-Fi module. The processor is configured to call a computer program stored in the memory to execute operations of the data transmission method provided by the first aspect of the embodiments of the present disclosure.

BRIEF DESCRIPTION OF THE DRAWINGS

FIG. 1 is a first schematic flow chart of a data transmission method provided by some embodiments of the present disclosure.

FIG. 2 is a second schematic flow chart of a data transmission method provided by some embodiments of the present disclosure.

FIG. 5 is a third schematic flow chart of a data transmission method provided by some embodiments of the present disclosure.

FIG. 6 is a fourth schematic flow chart of a data transmission method provided by some embodiments of the present disclosure.

FIG. 7 is a fifth schematic flow chart of a data transmission method provided by some embodiments of the present disclosure.

DETAILED DESCRIPTION

Figure 3:
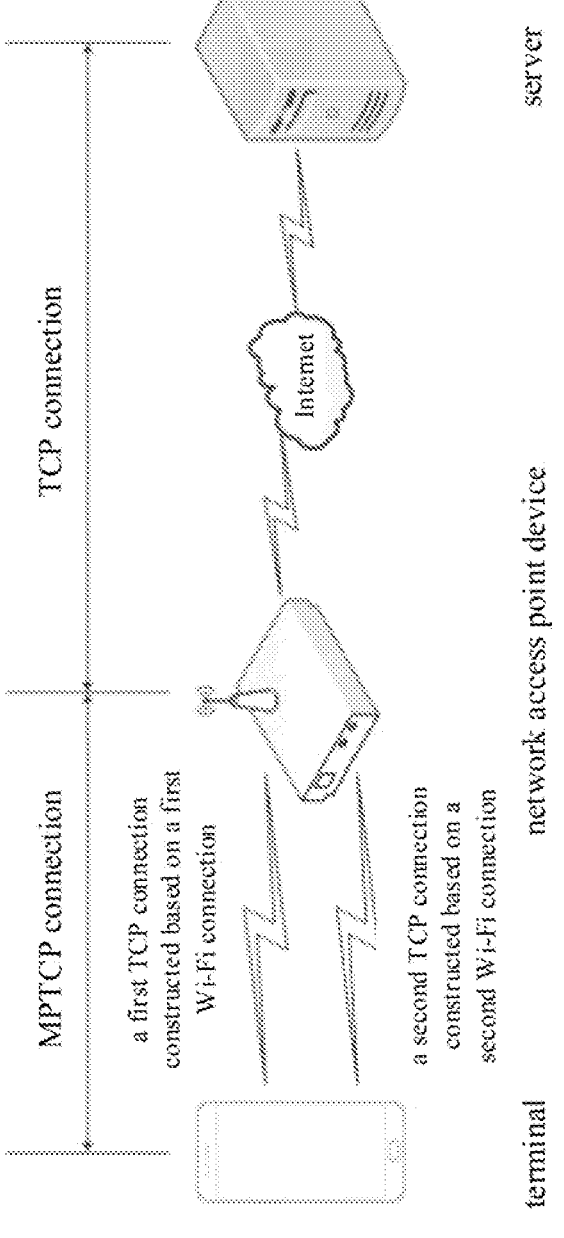
FIG. 3 is a schematic view illustrating a first scenario of the data transmission method provided by some embodiments of the present disclosure.

As shown in the figures, in which the same component symbols represent the same component, the principle of the present disclosure is illustrated by implementing some embodiments of the present disclosure in an appropriate computing environment. The following description is based on the illustrated specific embodiments of the present disclosure, and should not be considered as limiting other specific embodiments of the present disclosure which are not described in detail herein.

Some embodiments of the present disclosure provide a data transmission method, and the data transmission method is performed by a terminal. The terminal includes a first Wi-Fi module and a second Wi-Fi module. The data transmission method includes the following operations: establishing a Multipath Transmission Control Protocol (MPTCP) connection with a network access point device; and transmitting network access data to the network access point device through the MPTCP connection, and enabling the network access point device to transmit the network access data to a server requested to be accessed through a Transmission Control Protocol (TCP) connection. Herein, the MPTCP connection includes a first TCP connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

In some embodiments of the present disclosure, the transmitting network access data to the network access point device through the MPTCP connection includes transmitting the network access data to the network access point device by using a redundant scheduling strategy and through the MPTCP connection in response to the network access data being generated by a first type application. Herein, the first type application has a requirement for high reliability, and the redundant scheduling strategy is configured to transmit the same data through the first TCP connection and the second TCP connection.

In some embodiments of the present disclosure, the transmitting network access data to the network access point device through the MPTCP connection includes transmitting the network access data to the network access point device by using an aggregated scheduling strategy and through the MPTCP connection in response to the network access data being generated by a second type application. Herein, the second type application has a requirement for high rate, and the aggregated scheduling strategy is configured to distribute data to different TCP connections for transmitting.

In some embodiments of the present disclosure, the transmitting network access data to the network access point device through the MPTCP connection includes the following operations: transmitting the network access data to the network access point device through the first TCP connection; detecting whether a network quality of the second TCP connection meets a preset condition in response to detecting that a network quality of the first TCP connection fails to meet the preset condition; transmitting the network access data to the network access point device through the second TCP connection in response to the network quality of the second TCP connection meeting the preset condition.

In some embodiments of the present disclosure, the method further includes acquiring a residual power value of the terminal. The transmitting the network access data to the network access point device by using a redundant scheduling strategy and through the MPTCP connection in response to the network access data being generated by a first type application includes transmitting the network access data to the network access point device by using the redundant scheduling strategy and through the MPTCP connection in response to the network access data being generated by the first type application and the residual power value being greater than a preset threshold.

In some embodiments of the present disclosure, the method also includes acquiring data transmitted by the server from the network access point device through the MPTCP connection.

Some embodiments of the present disclosure also provide a data transmission method, and the data transmission method is performed by a network access point device. The method includes the following operations: establishing a MPTCP connection with a terminal; acquiring network access data from the terminal through the MPTCP connection, establishing a TCP connection with a server requested to be accessed by the network access data, and transmitting the network access data to the server through the TCP connection; and acquiring data to be transmitted to the terminal from the server through the TCP connection and transmitting the data to the terminal through the MPTCP connection. Herein, the MPTCP connection includes a first TCP connection and a second TCP connection, the first TCP connection is constructed based on a first Wi-Fi connection between the terminal and the network access point device, and the second TCP connection is constructed based on a second Wi-Fi connection between the terminal and the network access point device.

Some embodiments of the present disclosure also provide a data transmission method, and the data transmission method is performed by a data transmission system. The data transmission system includes a terminal, a network access point device, and a server. The data transmission method includes the following operations: establishing a MPTCP connection between the terminal and the network access point device and transmitting data between the terminal and the network access point device through the MPTCP connection; and establishing a TCP connection between the network access point device and the server and transmitting data between the network access point device and the server through the TCP connection. Herein the MPTCP connection includes a first TCP connection and a second TCP connection, the first TCP connection is constructed based on the first Wi-Fi connection between the terminal and the network access point device, and the second TCP connection is constructed based on the second Wi-Fi connection between the terminal and the network access point device.

In some embodiments of the present disclosure, after the establishing a TCP connection between the network access point device and the server and transmitting data between the network access point device and the server through the TCP connection, the method further includes the following operations: transmitting, the network access point device, the network access data to the server through the TCP connection after receiving the network access data transmitted by the terminal; or transmitting, the server, feedback data to the network access point device through the TCP connection, and transmitting, by the network access point device, the feedback data to the terminal through the MPTCP connection in response to the server needing to transmit the feedback data to the terminal.

In some embodiments of the present disclosure, the method also includes transmitting data between the terminal and the network access point device by using a redundant scheduling strategy and through the MPTCP connection in response to transmitting data between the terminal and the network access point device.

Some embodiments of the present disclosure also provide a data transmission apparatus, and the data transmission apparatus is applied to a terminal. The terminal includes a first Wi-Fi module and a second Wi-Fi module. The data transmission apparatus includes the following components: a first connecting module, configured to establish a Multipath Transmission Control Protocol (MPTCP) connection with a network access point device; and a first transmitting module, configured to transmit network access data to the network access point device through the MPTCP connection and enable the network access point device to transmit the network access data to a server requested to be accessed through a TCP connection. Herein, the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

Some embodiments of the present disclosure also provide a data transmission apparatus, and the data transmission apparatus is applied to the network access point device. The data transmission apparatus includes the following components: a second connecting module, configured to establish a Multipath Transmission Control Protocol (MPTCP) connection with a terminal; a second receiving module, configured to acquire network access data from the terminal through the MPTCP connection, establish a TCP connection with a server requested to be accessed by the network access data, and transmit the network access data to the server through the TCP connection; and a second transmitting module, configured to acquire data to be transmitted to the terminal from the server through the TCP connection and transmit the data to the terminal through the MPTCP connection. Herein, the MPTCP connection includes a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device.

Some embodiments of the present disclosure also provide a terminal. The terminal includes a memory, a processor, a first Wi-Fi module, and a second Wi-Fi module. The processor is configured to call a computer program stored in the memory to execute the following operations: establishing a Multipath Transmission Control Protocol (MPTCP) connection with a network access point device; and transmitting network access data to the network access point device through the MPTCP connection, and enabling the network access point device to transmit the network access data to a server requested to be accessed through a TCP connection. Herein, the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

In some embodiments of the present disclosure, in response to executing the transmitting network access data to the network access point device through the MPTCP connection, the processor executes the following operations: transmitting the network access data to the network access point device by using a redundant scheduling strategy and through the MPTCP connection in response to the network access data being generated by a first type application. Herein, the first type application has a requirement for high reliability, and the redundant scheduling strategy is configured to transmit the same data through the first TCP connection and the second TCP connection.

In some embodiments of the present disclosure, in response to executing the transmitting network access data to the network access point device through the MPTCP connection, the processor executes the following operations: transmitting the network access data to the network access point device by using an aggregated scheduling strategy and through the MPTCP connection in response to the network access data being generated by a second type application. Herein, the second type application has a requirement for high rate, and the aggregated scheduling strategy is configured to distribute data to different TCP connections for transmitting.

In some embodiments of the present disclosure, in response to executing the transmitting network access data to the network access point device through the MPTCP connection, the processor executes the following operations: transmitting the network access data to the network access point device through the first TCP connection: detecting whether a network quality of the second TCP connection meets a preset condition in response to detecting that a network quality of the first TCP connection fails to meet the preset condition; and transmitting the network access data to the network access point device through the second TCP connection in response to the network quality of the second TCP connection meeting the preset condition.

In some embodiments of the present disclosure, the processor further executes the following operations: acquiring a residual power value of the terminal; and transmitting the network access data to the network access point device by using the redundant scheduling strategy and through the MPTCP connection in response to the network access data being generated by the first type application and the residual power value being greater than a preset threshold.

In some embodiments of the present disclosure, the processor further executes the following operations: acquiring data transmitted by the server from the network access point device through the MPTCP connection.

Some embodiments of the present disclosure also provide a network access point device. The network access point device includes a memory and a processor. The processor is configured call a computer program stored in the memory to execute the following operations: establishing a Multipath Transmission Control Protocol (MPTCP) connection with a terminal; acquiring network access data from the terminal through the MPTCP connection, establishing a TCP connection with a server requested to be accessed by the network access data, and transmitting the network access data to the server through the TCP connection; and acquiring data to be transmitted to the terminal from the server through the TCP connection and transmitting the data to the terminal through the MPTCP connection. Herein, the MPTCP connection includes a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device.

Figures 1, 2:
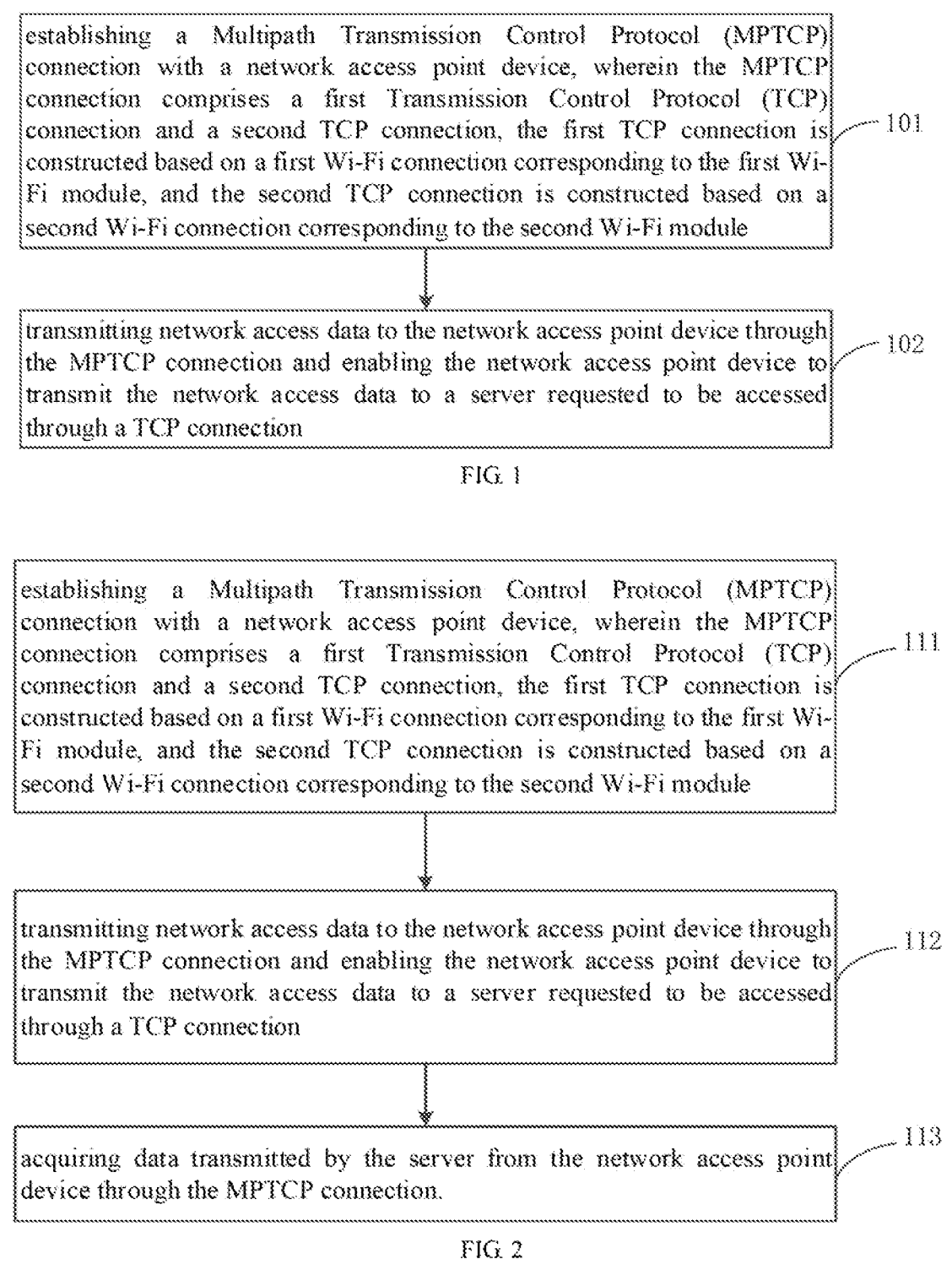

As shown in FIG. 1, FIG. 1 is a first schematic flow chart of a data transmission method provided by some embodiments of the present disclosure. The data transmission method may be performed by a terminal such as a smart phone, a tablet computer, or the like. The terminal may include a first Wi-Fi module and a second Wi-Fi module. That is, the terminal may have a dual Wi-Fi function. In some embodiments, the first Wi-Fi module may include or be configured with a first MAC address and a first Wi-Fi antenna. The second Wi-Fi module may include or be configured with a second MAC address and a second Wi-Fi antenna. The first Wi-Fi module may establish a connection with a first Wi-Fi hotspot operating in a first frequency band through the first Wi-Fi antenna and based on the first MAC address. The second Wi-Fi module may establish a connection with a second Wi-Fi hotspot operating in a second frequency band through the second Wi-Fi antenna and based on the second MAC address. The first Wi-Fi hotspot and the second Wi-Fi hotspot may be the same device. The first frequency band and the second frequency band may be two operating frequency bands without interference or with little interference.

The data transmission method provided by some embodiments of the present disclosure may include the following operations.

101, the method includes establishing a Multipath Transmission Control Protocol (MPTCP) connection with a network access point device. Herein, the MPTCP connection includes a first Transmission Control Protocol (TCP) connection and a second TCP connection. The first TCP connection is constructed based on a first Wi-Fi connection corresponding to the first Wi-Fi module. The second TCP connection is constructed based on a second Wi-Fi connection corresponding to the second Wi-Fi module.

Data transmission is often required between different devices. For example, as a mobile terminal accesses a network, the mobile terminal may transmit a network access request to a network access point device, and then the network access point device may transmit the network access request of the mobile terminal to a network device such as an application server or the like. However, in the related art, the efficiency of the data transmission is still low.

In some embodiments of the present disclosure, the terminal may establish the MPTCP connection with the network access point device. It should be noted that, the MPTCP is an extension and evolution of the TCP. The MPTCP enables two devices in communication with each other to establish a plurality of TCP connections for data transmission.

The MPTCP connection established between the terminal and the network access point device may include the first TCP connection and the second TCP connection. The first TCP connection is constructed based on the first Wi-Fi connection corresponding to the first Wi-Fi module. The second TCP connection is constructed based on the second Wi-Fi connection corresponding to the second Wi-Fi module. That is, the terminal may construct the first TCP connection based on the first Wi-Fi connection established between the first Wi-Fi module and the network access point device. The terminal may construct the second TCP connection based on the second Wi-Fi connection established between the second Wi-Fi module and the network access point device.

102, the method includes transmitting network access data to the network access point device through the MPTCP connection, and enabling the network access point device to transmit the network access data to a server requested to be accessed through a TCP connection.

In some embodiments, after establishing the MPTCP connection with the network access point device, the terminal may transmit the network access data to the network access point device through the MPTCP connection. In this way, the network access point device may transmit the network access data to the server requested to be accessed through the TCP connection. That is, in some embodiments of the present disclosure, the TCP connection is established between the network access point device and the server.

It may be understood that, in some embodiments of the present disclosure, the terminal may establish the MPTCP connection with the network access point device. The MPTCP connection includes the first TCP connection and the second TCP connection. The first TCP connection is constructed based on the first Wi-Fi connection corresponding to the first Wi-Fi module. The second TCP connection is constructed based on the second Wi-Fi connection corresponding to the second Wi-Fi module. Then the terminal may transmit the network access data to the network access point device through the MPTCP connection. In this way, the network access point device may transmit the network access data to the server requested to be accessed through the TCP connection. That is, in some embodiments of the present disclosure, the terminal may establish the MPTCP connection with the network access point device based on a dual Wi-Fi link and transmit data through the MPTCP connection. Since the MPTCP connection is established between the terminal and the network access point device, one data flow may be transmitted through two Wi-Fi physical channels at the same time. In this way, the efficiency of the data transmission between the terminal and the network access point device may be improved.

As shown in FIG. 2. FIG. 2 is a second schematic flow chart of a data transmission method provided by some embodiments of the present disclosure.

111, the method includes establishing a Multipath Transmission Control Protocol (MPTCP) connection with a network access point device. Herein, the MPTCP connection includes a first Transmission Control Protocol (TCP) connection and a second TCP connection. The first TCP connection is constructed based on a first Wi-Fi connection corresponding to the first Wi-Fi module. The second TCP connection is constructed based on a second Wi-Fi connection corresponding to the second Wi-Fi module.

In some embodiments of the present disclosure, the terminal may establish the MPTCP connection with the network access point device.

The MPTCP connection established between the terminal and the network access point device may include the first TCP connection and the second TCP connection. The first TCP connection is constructed based on the first Wi-Fi connection corresponding to the first Wi-Fi module. The second TCP connection is constructed based on the second Wi-Fi connection corresponding to the second Wi-Fi module. That is, the terminal may construct the first TCP connection based on the first Wi-Fi connection established between the first Wi-Fi module and the network access point device. The terminal may construct the second TCP connection based on the second Wi-Fi connection established between the second Wi-Fi module and the network access point device.

112, the method includes transmitting network access data to the network access point device through the MPTCP connection, and enabling the network access point device to transmit the network access data to a server requested to be accessed through a TCP connection.

In some embodiments, after establishing the MPTCP connection with the network access point device, the terminal may transmit the network access data to the network access point device through the MPTCP connection. In this way, the network access point device may transmit the network access data to the server requested to be accessed through the TCP connection. That is, in some embodiments of the present disclosure, the TCP connection is established between the network access point device and the server.

113, the method includes acquiring data transmitted by the server from the network access point device through the MPTCP connection.

In some embodiments, after the network access data transmitted by the terminal reaches the server requested to be accessed, the server may return feedback data to the terminal. The feedback data may be transmitted to the network access point device through the TCP connection, and then the network access point device may transmit the feedback data to the terminal through the MPTCP connection. That is, the terminal may acquire the data transmitted by the server from the network access point device through the MPTCP connection.

In some embodiments, in case that the terminal does not transmit the network access data, the server may actively push data to the terminal based on the established connection between the devices. The data may be transmitted to the network access point device through TCP connection firstly, and then the network access point device may transmit the data to the terminal through the MPTCP connection.

As shown in FIG. 3, FIG. 3 is a schematic view illustrating a first scenario of the data transmission method provided by some embodiments of the present disclosure.

It may be understood that, in some embodiments of the present disclosure, the terminal may establish the MPTCP connection with the network access point device. The MPTCP connection includes the first TCP connection and the second TCP connection. The first TCP connection is constructed based on the first Wi-Fi connection corresponding to the first Wi-Fi module. The second TCP connection is constructed based on the second Wi-Fi connection corresponding to the second Wi-Fi module. Then the terminal may transmit the network access data to the network access point device through the MPTCP connection. In this way, the network access point device may transmit the network access data to the server requested to be accessed through the TCP connection. In addition, the terminal may acquire data transmitted by the server from the network access point device through the MPTCP connection. That is, in some embodiments of the present disclosure, the terminal may establish the MPTCP connection with the network access point device based on a dual Wi-Fi link and transmit data through the MPTCP connection. Since the MPTCP connection is established between the terminal and the network access point device, one data flow may be transmitted through two Wi-Fi physical channels at the same time. In this way, the efficiency of the data transmission between the terminal and the network access point device may be improved.

In the related art, the scheme of establishing a simple dual Wi-Fi connection between the terminal and the network access point device is provided. Although the scheme in the related art may establish two physical Wi-Fi channels and distribute a plurality of data flows to the two Wi-Fi channels for transmitting, but one data flow can be transmitted on only one Wi-Fi channel. Therefore, the aggregation of the two Wi-Fi links cannot be realized, and in practical applications, one main Wi-Fi channel carries most of the data traffic in many cases. Therefore, the data transmission efficiency of the simple dual Wi-Fi connection scheme is low, while the data transmission efficiency of some embodiments of the present disclosure is high.

Figure 4:
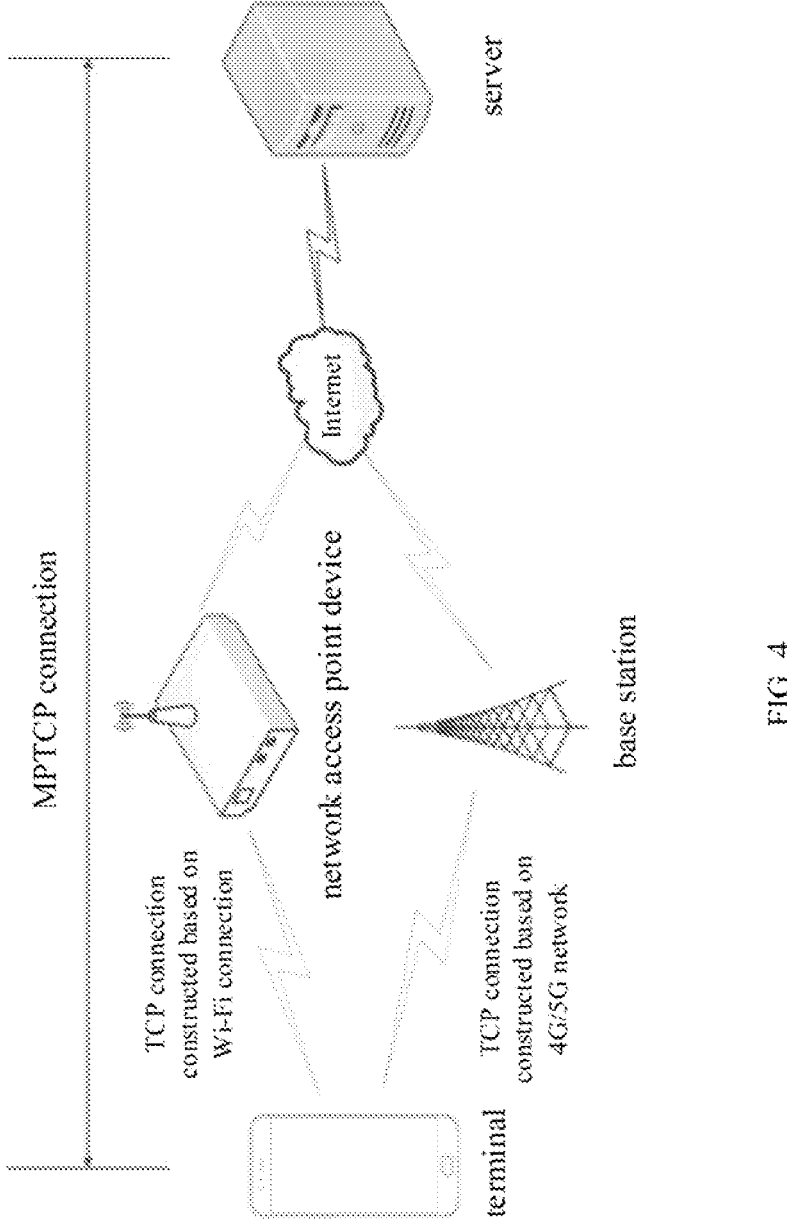
FIG. 4 is a schematic view illustrating a scenario of establishing a MPTCP connection between a terminal and a server by using a Wi-Fi network and a mobile data network in the related art, and the MPTCP connection is configured to transmit data between the terminal and the server.

As shown in FIG. 4, FIG. 4 is a schematic view illustrating a scenario of establishing a MPTCP connection between the terminal and the server by using a Wi-Fi network and a mobile data network (e.g., 4G/5G network) in the related art, and the MPTCP connection is configured to transmit data between the terminal and the server. For example, the MPTCP connection may include two TCP sub-connections. One of the two TCP sub-connections is constructed based on the Wi-Fi network, and the other of the two TCP sub-connections is constructed based on the mobile data network. Since the MPTCP technology requires the supports of the two devices, the MPTCP function should be deployed on both the server and the terminal. The servers corresponding to different applications are generally different. Therefore, even if the MPTCP function is deployed on the terminal, as an application needs to use the MPTCP function, the MPTCP function should be also deployed on the server corresponding to the application. Obviously, the aforementioned scheme is difficult to deploy. In addition, because one of the two TCP sub-connections uses the mobile data network, there will be traffic costs for the user.

The scheme of the present disclosure does not need to deploy the MPTCP function on the server, but only needs to deploy the MPTCP function on the network access point device and the terminal, in this way, the deployment is simple. In addition, the scheme of the present disclosure is a physical multipath based on two Wi-Fi channels, which does not involve the mobile data network, in this way, there are no additional data traffic costs.

Figure 5:
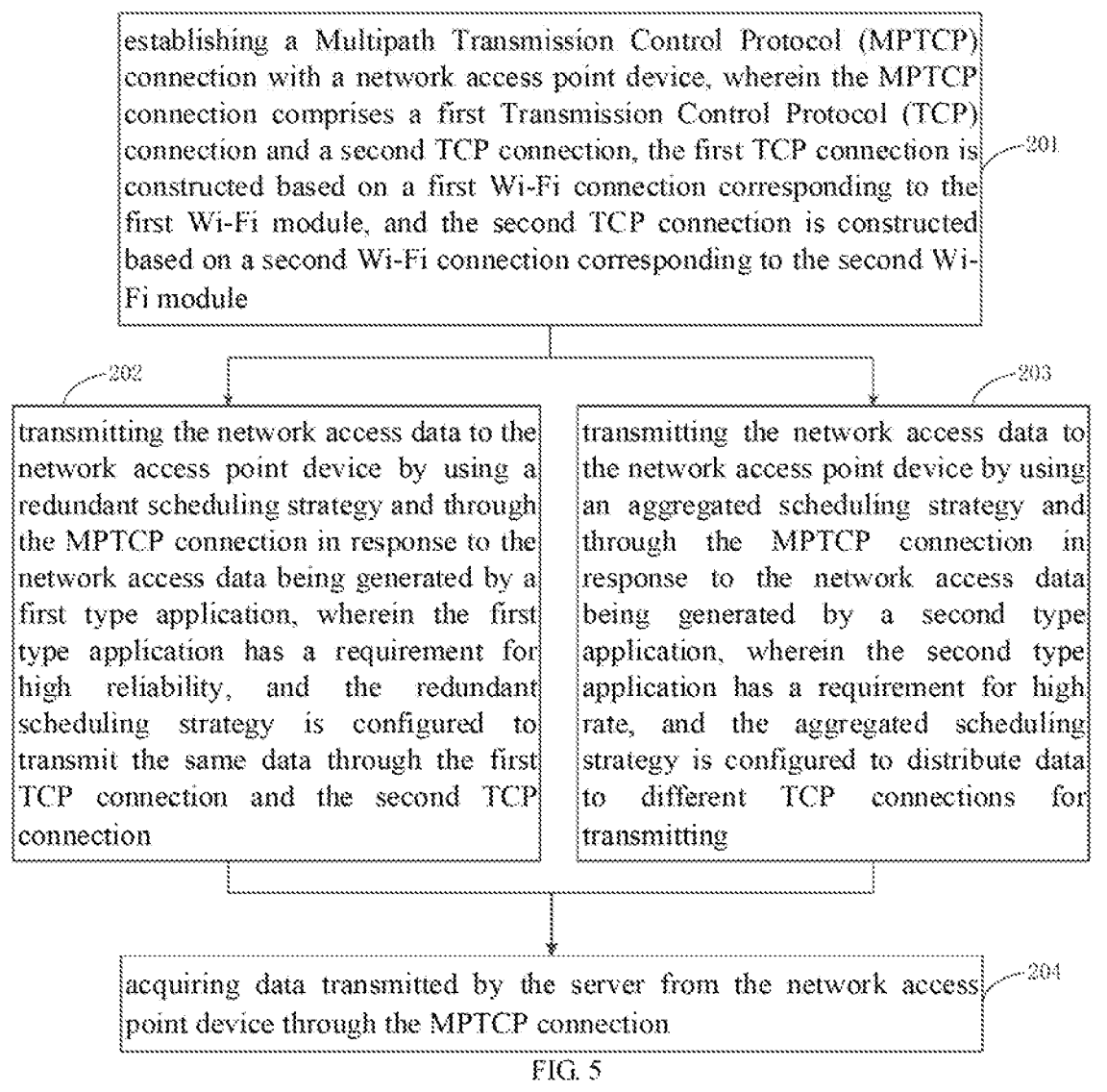

As shown in FIG. 5, FIG. 5 is a third schematic flow chart of a data transmission method provided by some embodiments of the present disclosure. The data transmission method may be performed by a terminal. The terminal may have a first Wi-Fi module and a second Wi-Fi module. That is, the terminal may have a dual Wi-Fi function.

The data transmission method provided by some embodiments of the present disclosure may include the following operations.

201, the method includes establishing, by the terminal, a Multipath Transmission Control Protocol (MPTCP) connection with a network access point device. Herein, the MPTCP connection includes a first Transmission Control Protocol (TCP) connection and a second TCP connection. The first TCP connection is constructed based on a first Wi-Fi connection corresponding to the first Wi-Fi module. The second TCP connection is constructed based on a second Wi-Fi connection corresponding to the second Wi-Fi module.

In some embodiments, the terminal may establish a MPTCP connection with the network access point device. The MPTCP connection established between the terminal and the network access point device may include the first TCP connection and the second TCP connection. The first TCP connection is constructed based on the first Wi-Fi connection corresponding to the first Wi-Fi module. The second TCP connection is constructed based on the second Wi-Fi connection corresponding to the second Wi-Fi module. That is, the terminal may construct the first TCP connection based on the first Wi-Fi connection established between the first Wi-Fi module and the network access point device. The terminal may construct the second TCP connection based on the second Wi-Fi connection established between the second Wi-Fi module and the network access point device.

In some embodiments, the network access point device may be a device such as a Wi-Fi Access Point (AP), or the like.

After establishing the MPTCP connection with the network access point device, as the terminal needs to transmit the network access data, the terminal may firstly detect whether the network access data is generated by a first type application or a second type application.

In response to detecting that the network access data is generated by the first type application, the method may enter the operation of 202.

In response to detecting that the network access data is generated by the second type application, the method may enter the operation of 203.

In response to detecting that the network access data is neither generated by the first type application nor generated by the second type application, the terminal may transmit the network access data to the network access point device through the MPTCP connection under a condition without a specific scheduling strategy.

202, the method includes transmitting, by the terminal, the network access data to the network access point device by using a redundant scheduling strategy and through the MPTCP connection in response to the network access data of the terminal being generated by a first type application, and enabling the network access point device to transmit the network access point device to a server requested to be accessed through a TCP connection. Herein, the first type application has a requirement for high reliability, and the redundant scheduling strategy is configured to transmit the same data through the first TCP connection and the second TCP connection.

In some embodiments, in response to detecting that the network access data is generated by the first type application, the terminal may transmit the network access data to the network access point device through the MPTCP connection by using the redundant scheduling strategy. In this way, the network access point device may transmit the network access data to the server requested to be accessed through the TCP connection. That is, the TCP connection is established between the network access point device and the server. Herein, the first type application has a requirement for high reliability, such as a mail application, a payment application, a mobile banking application, and so on, which requires the data to be transmitted to the corresponding device reliably. The redundant scheduling strategy is configured to transmit the same data through the first TCP connection and the second TCP connection.

For example, the network access data generated by the terminal includes three data packets A, B, and C. Based on the redundant scheduling strategy, the terminal may transmit the three packets A, B. and C through the first TCP connection, and transmit the three packets A, B. and C through the second TCP connection.

The data transmission method provided by some embodiments of the present disclosure may also include the following operations.

The terminal is configured to acquire a residual power value.

In response to executing the operation of transmitting the network access data to the network access point device by using a redundant scheduling strategy and through the MPTCP connection in response to the network access data being generated by a first type application, the terminal is configured to transmit the network access data to the network access point device by using the redundant scheduling strategy and through the MPTCP connection in response to the network access data being generated by the first type application and the residual power value being greater than a preset threshold.

In some embodiments, before using the redundant scheduling strategy to transmit the network access data, the terminal may also acquire the residual power value.

In case that the residual power value is greater than a preset threshold, it may be considered that the power of the terminal is sufficient. In this case, the terminal may use the redundant scheduling strategy to transmit the network access data generated by the first type application to the network access point device through the MPTCP connection.

In case that the residual power value is less than or equal to the preset threshold, it may be considered that the power of the terminal is insufficient. In this case, the terminal may transmit the network access data through one of the two TCP sub-connections, but not transmit the network access data generated by the first type application to the network access point device by using the redundant scheduling strategy and through the MPTCP connection. In this way, the power consumption of the terminal may be reduced.

203, the method includes transmitting, by the terminal, the network access data to the network access point device by using an aggregated scheduling strategy and through the MPTCP connection in response to the network access data being generated by a second type application. Herein, the second type application has a requirement for high rate, and the aggregated scheduling strategy is configured to distribute data to different TCP connections for transmitting.

In some embodiments, in response to detecting that the network access data is generated by the second type application, the terminal may transmit the network access data to the network access point device by using the aggregated scheduling strategy and through the MPTCP connection. In this way, the network access point device may transmit the network access data to the server requested to be accessed through the TCP connection. That is, the TCP connection is established between the network access point device and the server. Herein, the second type application has a requirement for high rate, such as an online video play application, a video live application, a game application, and so on, which requires the data to be transmitted to a corresponding device quickly. The aggregated scheduling strategy is configured to distribute the data to different TCP sub-connections for transmitting.

In some embodiments, the network access data generated by the terminal includes three data packets A, B, and C. Based on the aggregated scheduling strategy, the terminal may distribute the three data packets A, B, and C to the first TCP connection and the second TCP connection for transmitting. In some embodiments, the terminal may distribute the data packets A and B to the first TCP connection for transmitting, and distribute the data packet C to the second TCP connection for transmitting.

204, the method includes acquiring, by the terminal, data transmitted by the server from the network access point device through the MPTCP connection.

In some embodiments, after the network access data transmitted by the terminal reaches the server requested to be accessed, the server may return feedback data to the terminal. The feedback data may be transmitted to the network access point device through the TCP connection, and then the network access point device may transmit the feedback data to the terminal through the MPTCP connection. That is, the terminal may acquire the data transmitted by the server from the network access point device through the MPTCP connection.

In some embodiments, in case that the terminal does not transmit the network access data, the server may actively push data to the terminal based on the established connection between the devices. The data may be transmitted to the network access point device through TCP connection firstly, and then the network access point device may transmit the data to the terminal through the MPTCP connection.

In addition to selecting different scheduling strategies based on the types of application generating the network access data to transmit the data between the terminal and network access point device through the MPTCP connection, in some embodiments, the following scheduling strategy may also be used, that is, the operation of transmitting the network access data to the network access point device through the MPTCP connection may include the following operations.

The method includes transmitting, by the terminal, the network access data to the network access point device through the first TCP connection.

The method includes detecting, by the terminal, whether a network quality of the second TCP connection meets a preset condition in response to detecting that a network quality of the first TCP connection fails to meet the preset condition.

The method includes transmitting, by the terminal, the network access data to the network access point device through the second TCP connection in response to the network quality of the second TCP connection meeting the preset condition.

In some embodiments, the terminal may firstly transmit the network access data to the network access point device only through the first TCP connection, without using the second TCP connection for data transmission. The second TCP connection is a standby connection at this time, and may be maintained. In the process of transmitting data through the first TCP connection, the terminal may detect whether the network quality of the first TCP connection meets the preset condition.

In case that the network quality of the first TCP connection meets the preset condition, the terminal may continue to transmit data between the terminal and the network access point device through the first TCP connection until it is detected that the network quality of the first TCP connection no longer meets the preset condition. Then the terminal may detect whether the network quality of the second TCP connection meets the preset condition.

In response to detecting that the network quality of the second TCP connection meets the preset condition, the terminal may transmit the network access data to the network access point device only through the second TCP connection. That is, the terminal abandons using the first TCP connection for data transmission, but the first TCP connection may be maintained without interruption.

In response to detecting that the network quality of the second TCP connection fails to meet the preset condition, the terminal may compare the network quality of the first TCP connection with the network quality of the second TCP connection, and transmit data through the TCP connection with a better network quality. In some embodiments, the terminal may still transmit data by only using the first TCP connection between the terminal and the network access point device without switching to the second TCP connection, so as to reduce the system overhead caused by switching.

In some embodiments, in case that the network quality of the TCP sub-connection in the MPTCP connection meets the preset condition, the network quality of the TCP sub-connection is relatively good. While in case that the network quality of the TCP sub-connection fails to meet the preset condition, the network quality of the TCP sub-connection is relatively poor.

In some embodiments, that the network quality of the TCP sub-connection meets the preset condition may include the situation that a delay duration is less than a preset duration threshold, a packet loss rate is less than a preset percentage threshold, and so on. Some embodiments of the present disclosure does not make specific restrictions on which network indicators are used to indicate that the network quality meets the preset condition, as long as the network indicators may be used to indicate whether the network quality is good or bad.

As shown in FIG. 6, FIG. 6 is a fourth schematic flow chart of a data transmission method provided by some embodiments of the present disclosure. The data transmission method may be performed by a network access point device such as a Wi-Fi Access Point (AP), or the like. The network access point device may support a dual Wi-Fi function and a MPTCP connection function.

The data transmission method provided by some embodiments of the present disclosure may include the following operations.

301, the method includes establishing a Multipath Transmission Control Protocol (MPTCP) connection with a terminal. Herein, the MPTCP connection includes a first Transmission Control Protocol (TCP) connection and a second TCP connection. The first TCP connection is constructed based on a first Wi-Fi connection between the terminal and the network access point device. The second TCP connection is constructed based on a second Wi-Fi connection between the terminal and the network access point device.

In some embodiments, the network access point device may firstly establish the MPTCP connection with the terminal. The MPTCP connection may include the first TCP connection and the second TCP connection. The first TCP connection may be constructed based on the first Wi-Fi connection between the network access point device and the terminal. The second TCP connection may be constructed based on the second Wi-Fi connection between the network access point device and the terminal. That is, the terminal may construct the first TCP connection based on the first Wi-Fi connection established between the first Wi-Fi module and the network access point device. The terminal may construct the second TCP connection based on the second Wi-Fi connection established between the second Wi-Fi module and the network access point device.

302, the method includes acquiring network access data from the terminal through the MPTCP connection, establishing a TCP connection with a server requested to be accessed by the network access data, and transmitting the network access data to the server through the TCP connection.

In some embodiments, after the network access point device establishes the MPTCP connection with the terminal, the terminal may transmit the network access data to the network access point device through the MPTCP connection as the terminal needs to transmit the network access data. In this way, the network access point device may acquire the network access data from the terminal through the MPTCP connection.

Then the network access point device may establish the TCP connection with the server requested to be accessed by the network access data and transmit the network access data to the server through the TCP connection.

303, the method includes acquiring data to be transmitted to the terminal from the server through the TCP connection and transmitting the data to the terminal through the MPTCP connection.

In some embodiments, as the server needs to transmit data to the terminal, the server may firstly transmit the data to the network access point device through the TCP connection. In this way, the network access point device may acquire the data to be transmitted to the terminal from the server through the TCP connection. Then the network access point device may transmit the data to the terminal through the MPTCP connection.

As shown in FIG. 7, FIG. 7 is a fifth schematic flow chart of a data transmission method provided by some embodiments of the present disclosure. The data transmission method may be performed by a data transmission system. The data transmission system may include a terminal, a network access point device, and a server.

The data transmission method provided by some embodiments of the present disclosure may include the following operations.

401, the method includes establishing a Multipath Transmission Control Protocol (MPTCP) connection between the terminal and the network access point device and transmitting data between the terminal and the network access point device through the MPTCP connection. Herein, the MPTCP connection includes a first Transmission Control Protocol (TCP) connection and a second TCP connection. The first TCP connection is constructed based on the first Wi-Fi connection between the terminal and the network access point device. The second TCP connection is constructed based on the second Wi-Fi connection between the terminal and the network access point device.

In some embodiments, the terminal may include a first Wi-Fi module and a second Wi-Fi module. Based on the first Wi-Fi module and the second Wi-Fi module, the terminal may establish the MPTCP connection with the network access point device. The MPTCP connection may include the first TCP connection and the second TCP connection. The first TCP connection is constructed based on the first Wi-Fi connection between the terminal and the network access point device. The second TCP connection is constructed based on the second Wi-Fi connection between the terminal and the network access point device.

After the MPTCP connection is established between the terminal and the network access point device, data may be transmitted between the terminal and the network access point device through the MPTCP connection. In some embodiments, the terminal may transmit the network access data to the network access point device through the MPTCP connection. In some embodiments, the network access point device may transmit the data from the network to the terminal through the MPTCP connection.

402, the method includes establishing a TCP connection between the network access point device and the server and transmitting data between the network access point device and the server through the TCP connection.

In some embodiments, the TCP connection may be established between the network access point device and the server, and the TCP connection may be used for data transmission.

In some embodiments, after receiving the network access data transmitted by the terminal, the network access point device may transmit the network access data to the server through the TCP connection.

In some embodiments, as the server needs to feed back data to the terminal, the server may transmit feedback data to the network access point device through the TCP connection, and then the network access point device may transmit the feedback data to the terminal through the MPTCP connection.

In some embodiments, as the terminal and network access point device construct a mesh network, the MPTCP connection may be established between the terminal and the network access point device based on the two physical channels of the dual Wi-Fi connection. As data transmission is required between the terminal and the network access point device, the redundant scheduling strategy may be used to transmit data through the MPTCP connection, so as to improve the reliability of the mesh network.

Figure 8:
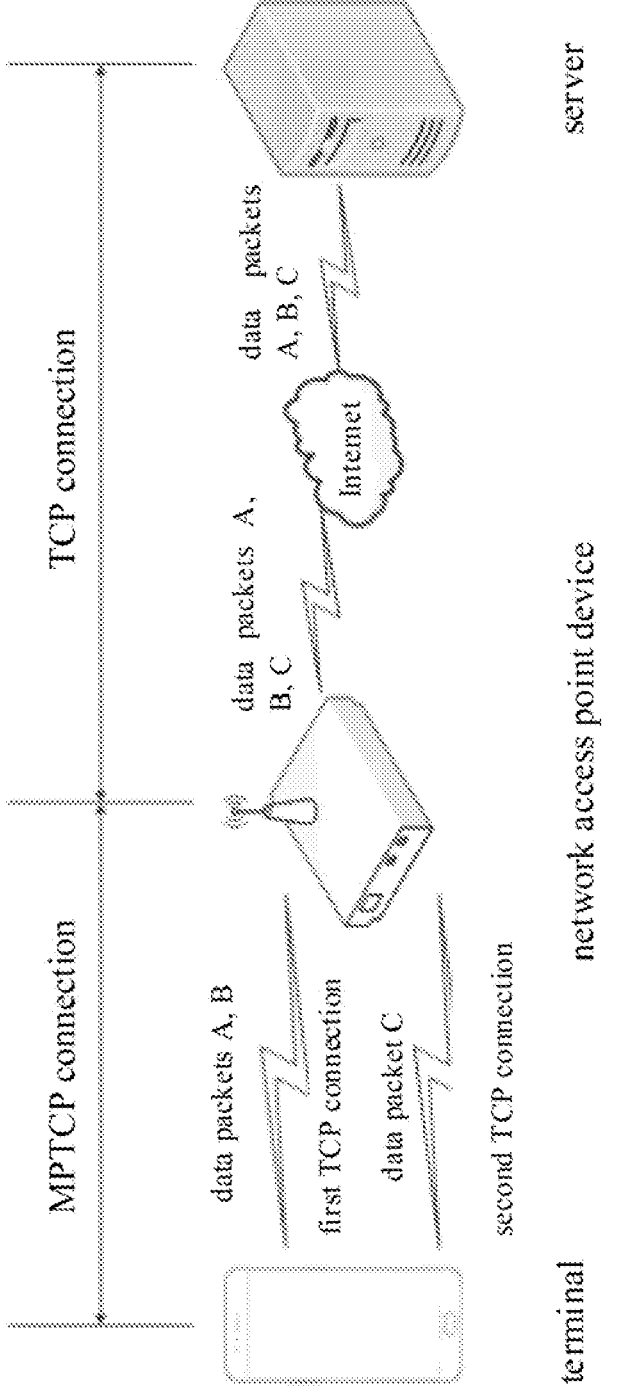
FIGS. 8-9 are schematic views illustrating a second scenario of the data transmission method provided by some embodiments of the present disclosure.
Figure 9:
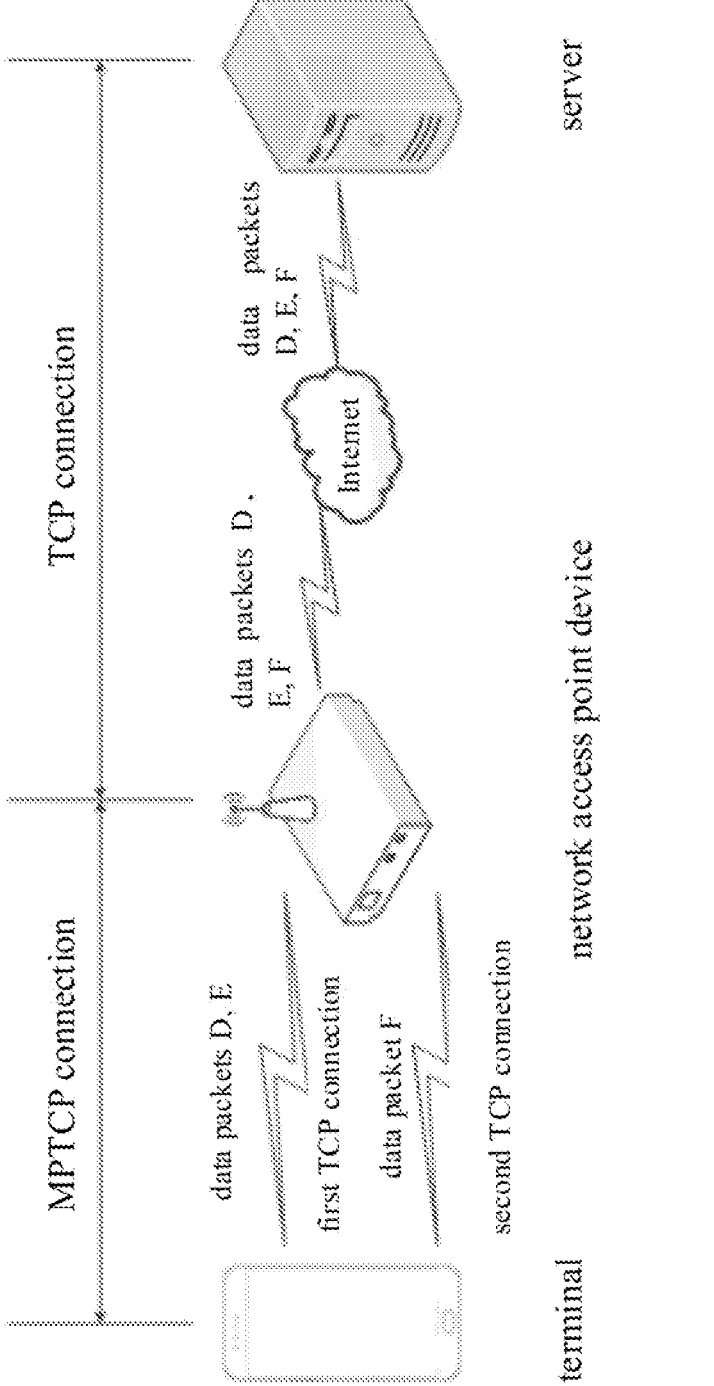

As shown in FIGS. 8-9, FIGS. 8-9 are schematic views illustrating a second scenario of the data transmission method provided by some embodiments of the present disclosure.

In some embodiments, the terminal may include a first Wi-Fi module and a second Wi-Fi module. That is, the terminal may support a dual Wi-Fi function, and the terminal is deployed with a MPTCP function.

As the terminal enters the communication range of a Wi-Fi Access Point, the terminal may establish a MPTCP connection with the Wi-Fi Access Point. The Wi-Fi Access Point is also deployed with the MPTCP function. The MPTCP connection established between the terminal and the Wi-Fi Access Point may include a first TCP connection and a second TCP connection. The first TCP connection may be constructed based on the first Wi-Fi connection established by the terminal and the Wi-Fi Access Point through the first Wi-Fi module. The second TCP connection may be constructed based on the second Wi-Fi connection established by the terminal and the Wi-Fi Access Point through the second Wi-Fi module.

For example, in case that the terminal is running a game application currently, then the terminal may distribute the data flow generated by the game application into a plurality of data packets, and transmit the plurality of data packets to the Wi-Fi Access Point through the MPTCP connection. For example, the game application generates three data packets A, B, and C. Since the game application has a requirement for high rate, the terminal may transmit the data packets A and B to the Wi-Fi Access Point through the first TCP connection and transmit the data packet C to the Wi-Fi Access Point through the second TCP connection, as shown in FIG. 8.

After receiving packets A, B and C, the Wi-Fi Access Point may establish a TCP connection with the server corresponding to the game application. After establishing the TCP connection, the Wi-Fi Access Point may transmit the data packets A, B and C to the server through the TCP connection, as shown in FIG. 8.

After receiving the data corresponding to the data packets A, B and C, the server may process the data. For example, the server needs to feed back a message to the terminal, and the data corresponding to the message includes three data packets D, E, and F. Then the server may transmit the data packets D. E and F to the Wi-Fi Access Point through the TCP connection. The Wi-Fi Access Point may transmit the data packets D, E, and F to the terminal through the MPTCP connection. For example, the data packets D, E are transmitted to the terminal through the first TCP connection, and the data packet F is transmitted to the terminal through the second TCP connection, as shown in FIG. 9.

Figure 10:
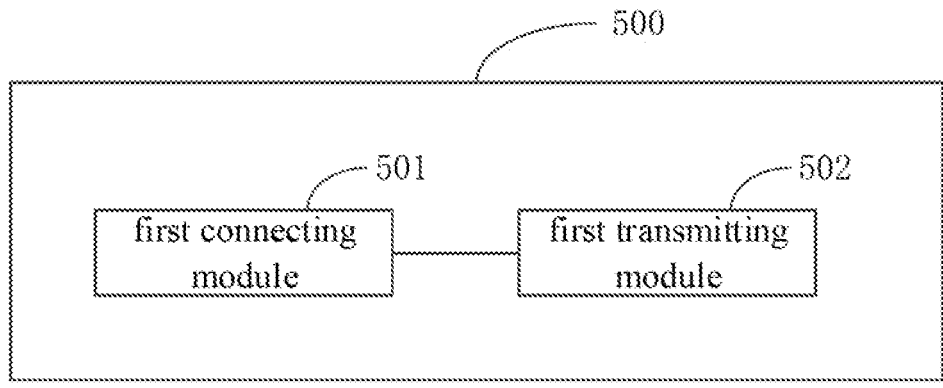
FIG. 10 is a first schematic structural view of a data transmission apparatus provided by some embodiments of the present disclosure.

As shown in FIG. 10, FIG. 10 is a first schematic structural view of a data transmission apparatus provided by some embodiments of the present disclosure. The data transmission apparatus may be applied to a terminal. The terminal may include a first Wi-Fi module and a second Wi-Fi module. The data transmission apparatus 500 may include a first connecting module 501 and a first transmitting module 502.

The first connecting module 501 is configured to establish a Multipath Transmission Control Protocol (MPTCP) connection with a network access point device. Herein, the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

The first transmitting module 502 is configured to transmit network access data to the network access point device through the MPTCP connection, and enable the network access point device to transmit the network access data to a server requested to be accessed through a TCP connection.

In some embodiments, the data transmission apparatus 500 may also include a first receiving module. The first receiving module is configured to acquire data transmitted by the server from the network access point device through the MPTCP connection.

In some embodiments, the first transmitting module 502 may be configured to execute the following operations: transmitting the network access data to the network access point device by using a redundant scheduling strategy and through the MPTCP connection in response to the network access data being generated by a first type application. Herein, the first type application has a requirement for high reliability, and the redundant scheduling strategy is configured to transmit the same data through the first TCP connection and the second TCP connection.

In some embodiments, the first transmitting module 502 may be configured to execute the following operations: transmitting the network access data to the network access point device by using an aggregated scheduling strategy and through the MPTCP connection in response to the network access data being generated by a second type application. Herein, the second type application has a requirement for high rate, and the aggregated scheduling strategy is configured to distribute data to different TCP connections for transmitting.

In some embodiments, the first transmitting module 502 may be configured to execute the following operations: transmitting the network access data to the network access point device through the first TCP connection; detecting whether a network quality of the second TCP connection meets a preset condition in response to detecting that a network quality of the first TCP connection fails to meet the preset condition; and transmitting the network access data to the network access point device through the second TCP connection in response to the network quality of the second TCP connection meeting the preset condition.

In some embodiments, the first transmitting module 502 may also be configured to execute the following operations: acquiring a residual power value of the terminal; and transmitting the network access data to the network access point device by using the redundant scheduling strategy and through the MPTCP connection in response to the network access data being generated by the first type application and the residual power value being greater than a preset threshold.

Figure 11:
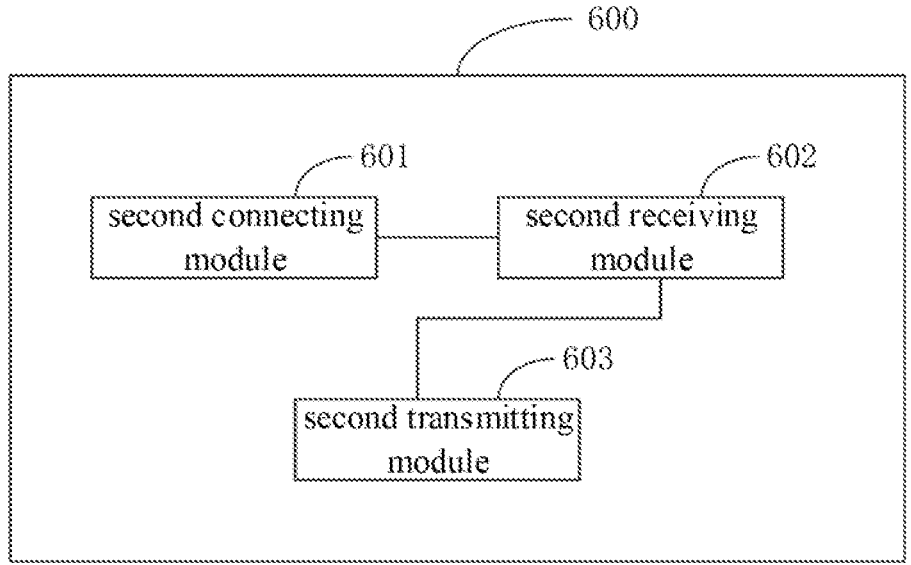
FIG. 11 is a second schematic structural view of a data transmission apparatus provided by some embodiments of the present disclosure.

As shown in FIG. 11, FIG. 11 is a second structure view of a data transmission apparatus provided by some embodiments of the present disclosure. The data transmission apparatus may be applied to a network access point device.

The data transmission apparatus 600 may include a second connecting module 601, a second receiving module 602, and a second transmitting module 603.

The second connecting module 601 is configured to establish a Multipath Transmission Control Protocol (MPTCP) connection with a terminal. Herein, the MPTCP connection includes a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device.

The second receiving module 602 is configured to acquire network access data from the terminal through the MPTCP connection, establish a TCP connection with a server requested to be accessed by the network access data, and transmit the network access data to the server through the TCP connection.

The second transmitting module 603 is configured to acquire data to be transmitted to the terminal from the server through the TCP connection and transmit the data to the terminal through the MPTCP connection.

Some embodiments of the present disclosure provide a computer readable storage medium on which a computer program is stored. In response to the computer program being executed on the computer, the computer is configured to execute the operations of the data transmission method provided by the aforementioned embodiments of the present disclosure.

Some embodiments of the present disclosure also provide a terminal. The terminal includes a memory, a processor, a first Wi-Fi module, and a second Wi-Fi module. The processor is configured to call a computer program stored in the memory to execute the operations of the data transmission method provided by the aforementioned embodiments of the present disclosure.

Figure 12:
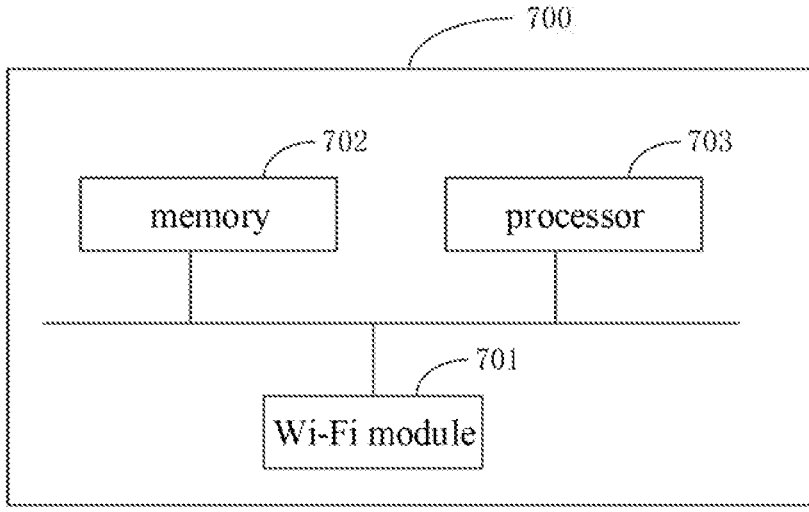
FIG. 12 is a schematic structural view of a terminal provided by some embodiments of the present disclosure.

In some embodiments, the terminal may be a mobile terminal such as a tablet computer, a smart phone, or the like. As shown in FIG. 12, FIG. 12 is a schematic structural view of a terminal provided by some embodiments of the present disclosure.

The terminal 700 may include a Wi-Fi module 701, a memory 702, a processor 703, and other components. Those skilled in the art may understand that the structure of the terminal shown in FIG. 12 does not constitute a limitation on the terminal, and the terminal may include more or fewer components than shown in the figures, a combination of some components, or an arrangement of different components.

The Wi-Fi module 701 may include a first Wi-Fi module and a second Wi-Fi module. The terminal may establish a first Wi-Fi connection with the network access point device through the first Wi-Fi module, and establish a second Wi-Fi connection with the network access point device through the second Wi-Fi module.

The memory 702 may be configured to store application programs and data. The application programs stored in the memory 702 may contain executable codes. The application programs may form various functional modules. The processor 703 is configured to execute various functional applications and process data by running the application programs stored in the memory 702.

The processor 703 is the control center of the terminal. The processor 703 is configured to connect various components of the entire terminal by using various interfaces and lines, and execute various functions of the terminal and process data by running or executing the application programs stored in the memory 702, and by calling the data stored in the memory 702, so as to monitor the terminal as a whole.

In some embodiments, the processor 703 in the terminal is configured to load the executable codes corresponding to the process of one or more application programs into the memory 702 according to the following instructions, and run the application programs stored in the memory 702 to execute the following operations.

The operations include: establishing a Multipath Transmission Control Protocol (MPTCP) connection with a network access point device. Herein the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

The operations further include: transmitting network access data to the network access point device through the MPTCP connection, and enabling the network access point device to transmit the network access data to a server requested to be accessed through a TCP connection.

Figure 13:
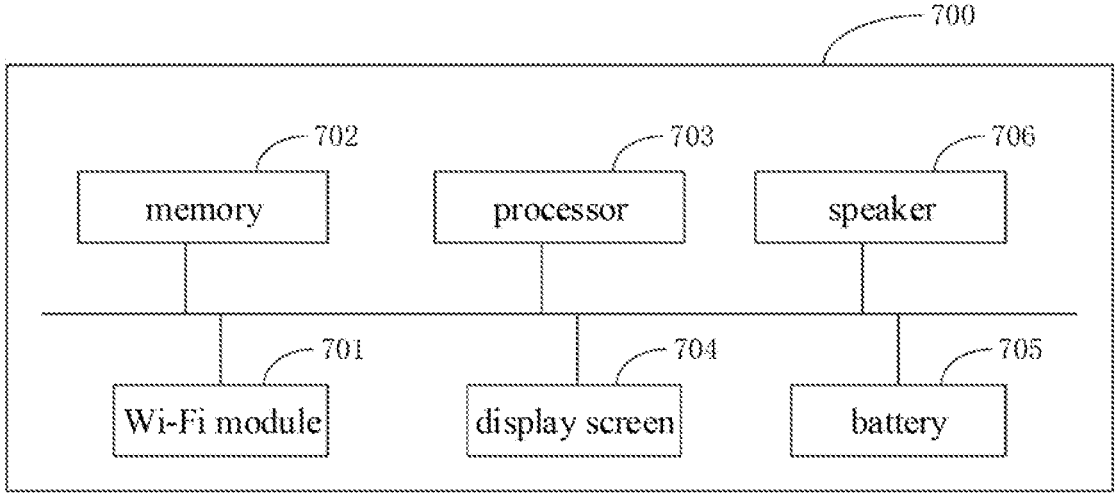
FIG. 13 is another schematic structural view of the terminal provided by some embodiments of the present disclosure.

As shown in FIG. 13, the terminal 700 may include a Wi-Fi module 701, a memory 702, a processor 703, a display screen 704, a battery 705, a speaker 706, and other components.

The Wi-Fi module 401 may include a first Wi-Fi module and a second Wi-Fi module. The terminal may establish a first Wi-Fi connection with the network access point device through the first Wi-Fi module, and establish a second Wi-Fi connection with the network access point device through the second Wi-Fi module.

The memory 702 may be configured to store application programs and data. The application programs stored in the memory 702 may contain executable codes. The application programs may form various functional modules. The processor 703 is configured to execute various functional applications and process data by running the application programs stored in the memory 702.

The processor 703 is the control center of the terminal. The processor 703 is configured to connect various components of the entire terminal by using various interfaces and lines, and execute various functions of the terminal and process data by running or executing the application programs stored in the memory 702, and by calling the data stored in the memory 702, so as to monitor the terminal as a whole.

The display screen 704 may be configured to display information such as texts, images, and the like.

The battery 705 may be configured to provide power support for each component and module of the terminal, so as to ensure the normal operation of each component and module.

The speaker 706 may be configured to play sound signals.

In some embodiments, the processor 703 in the terminal is configured to load the executable codes corresponding to the process of one or more application programs into the memory 702 according to the following instructions, and run the application programs stored in the memory 702 to execute the following operations.

The operations include: establishing a Multipath Transmission Control Protocol (MPTCP) connection with a network access point device. Herein the MPTCP connection includes a first Transmission Control Protocol (TCP) connection and a second TCP connection, the first TCP connection is constructed based on a first Wi-Fi connection corresponding to the first Wi-Fi module, and the second TCP connection is constructed based on a second Wi-Fi connection corresponding to the second Wi-Fi module.

The operations further include: transmitting network access data to the network access point device through the MPTCP connection, and enabling the network access point device to transmit the network access data to a server requested to be accessed through a TCP connection.

In some embodiments, the processor 703 may also execute the following operations: acquiring data transmitted by the server from the network access point device through the MPTCP connection.

In some embodiments, in response to executing the transmitting network access data to the network access point device through the MPTCP connection, the processor 703 executes the following operations: transmitting the network access data to the network access point device by using a redundant scheduling strategy and through the MPTCP connection in response to the network access data being generated by a first type application. Herein, the first type application has a requirement for high reliability, and the redundant scheduling strategy is configured to transmit the same data through the first TCP connection and the second TCP connection.

In some embodiments, in response to executing the transmitting network access data to the network access point device through the MPTCP connection, the processor 703 executes the following operations: transmitting the network access data to the network access point device by using an aggregated scheduling strategy and through the MPTCP connection in response to the network access data being generated by a second type application. Herein, the second type application has a requirement for high rate, and the aggregated scheduling strategy is configured to distribute data to different TCP connections for transmitting.

In some embodiments, in response to executing the transmitting network access data to the network access point device through the MPTCP connection, the processor 703 executes the following operations: transmitting the network access data to the network access point device through the first TCP connection; detecting whether a network quality of the second TCP connection meets a preset condition in response to detecting that a network quality of the first TCP connection fails to meet the preset condition; and transmitting the network access data to the network access point device through the second TCP connection in response to the network quality of the second TCP connection meeting the preset condition.

In some embodiments, the processor 703 may also execute the following operations: acquiring a residual power value of the terminal.

In response to executing the transmitting the network access data to the network access point device by using a redundant scheduling strategy and through the MPTCP connection in response to the network access data being generated by a first type application, the processor 703 executes the following operations: transmitting the network access data to the network access point device by using the redundant scheduling strategy and through the MPTCP connection in response to the network access data being generated by the first type application and the residual power value being greater than a preset threshold.

Figure 14:
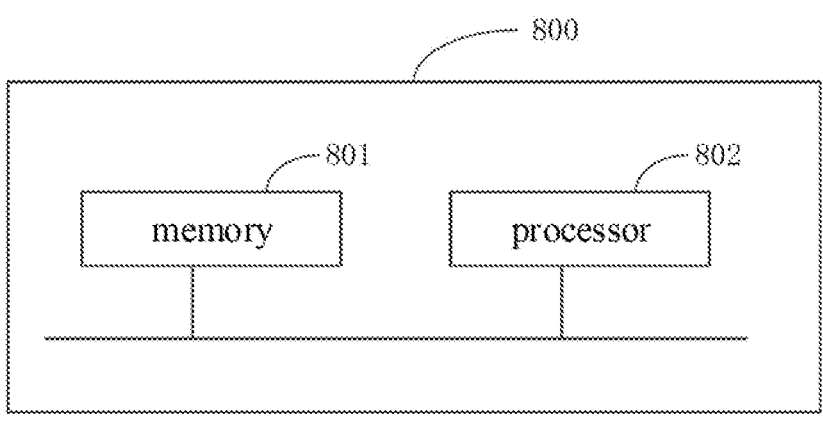
FIG. 14 is a schematic structural view of a network access point device provided by some embodiments of the present disclosure.

As shown in FIG. 14, FIG. 14 is a schematic structural view of a network access point device provided by some embodiments of the present disclosure.

The network access point device 800 may include a memory 801, a processor 802, and other components. Those skilled in the art may understand that the structure of the network access point device shown in FIG. 14 does not constitute a limitation on the network access point device, and the network access point device may include more or fewer components than shown in the figures, a combination of some components, or an arrangement of different components.

The memory 801 may be configured to store application programs and data. The application programs stored in the memory 801 may contain executable codes. The application programs may form various functional modules. The processor 802 is configured to execute various functional applications and process data by running the application programs stored in the memory 801.

The processor 802 is the control center of the terminal. The processor 802 is configured to connect various components of the entire terminal by using various interfaces and lines, and execute various functions of the terminal and process data by running or executing the application programs stored in the memory 801, and by calling the data stored in the memory 801, so as to monitor the terminal as a whole.

In some embodiments, the processor 802 in the terminal is configured to load the executable codes corresponding to the process of one or more application programs into the memory 801 according to the following instructions, and run the application programs stored in the memory 801 to execute the following operations.

The operation includes: establishing a Multipath Transmission Control Protocol (MPTCP) connection with a terminal. Herein, the MPTCP connection includes a first Transmission Control Protocol (TCP) connection and a second TCP connection, the first TCP connection is constructed based on a first Wi-Fi connection between the terminal and the network access point device, and the second TCP connection is constructed based on a second Wi-Fi connection between the terminal and the network access point device.

The method further includes: acquiring network access data from the terminal through the MPTCP connection, establishing a TCP connection with a server requested to be accessed by the network access data, and transmitting the network access data to the server through the TCP connection.

The method further includes: acquiring data to be transmitted to the terminal from the server through the TCP connection and transmitting the data to the terminal through the MPTCP connection.

In the above embodiments, the description of each embodiment has its own emphasis. For the part not detailed in one embodiment, please refer to the detailed description of the data transmission method above, which will not be repeated here.

The data transmission apparatus provided by some embodiments of the present disclosure and the data transmission method in the aforementioned embodiments have the same core idea. Any method provided in the embodiments of the data transmission method may be run on the data transmission apparatus. The specific implementation process is described in detail in the embodiments of the data transmission method, and will not be repeated here.

It should be noted that, for the data transmission method described in some embodiments of the present disclosure, those skilled in the art may understand that all or part of the process of realizing the data transmission method described in some embodiments of the present disclosure may be completed by controlling a relevant hardware by using a computer program. The computer program may be stored in a computer readable storage medium and executed by at least one processor. The execution process may include the operations of the embodiments of the data transmission method. The storage medium may be a magnetic disk, a compact disc, a Read Only Memory (ROM), a Random Access Memory (RAM), and so on.

For the data transmission apparatus described in some embodiments of the present disclosure, the functional modules may be integrated into one processing chip, or each of the functional modules may physically exist separately. Optionally, two or more modules may also be integrated into one module. The aforesaid integrated module may be implemented in the form of a hardware or in the form of a software functional module. The aforesaid integrated module may be stored in a computer readable storage medium in case that the integrated module is implemented in the form of the software functional module and sold or used as a standalone product. The storage medium may be a Read Only Memory (ROM), a magnetic disk, a compact disc, and so on.

A data transmission method, a data transmission apparatus, a storage medium, a terminal, and a network access point device provided by some embodiments of the present disclosure is described in detail herein. Specific embodiments are used to describe the principle and implementation mode of the present disclosure, and the aforesaid description of the embodiments is only used to help understand the method and the core idea of the present disclosure. For those skilled in the art, based on the idea of the present disclosure, there will be changes in the specific implementation mode and application scope. In conclusion, the contents of the description should not be understood as a limitation on the present disclosure.

What is claimed is:

1. A data transmission method performed by a terminal, the terminal comprising a first Wi-Fi module and a second Wi-Fi module, and the data transmission method comprising:

establishing a Multipath Transmission Control Protocol (MPTCP) connection between the terminal and a network access point device, wherein the MPTCP connection comprises a first Transmission Control Protocol (TCP) connection between the terminal and the network access point device and a second TCP connection between the terminal and the network access point device, the first TCP connection is constructed based on a first Wi-Fi connection between the first Wi-Fi module and the network access point device, and the second TCP connection is constructed based on a second Wi-Fi connection between the second Wi-Fi module and the network access point device; and transmitting network access data to the network access point device through the MPTCP connection and enabling the network access point device to transmit the network access data to a server requested to be accessed through a TCP connection between the network access point device and the server;

wherein the network access data comprises at least one data flow, each of the at least one data flow comprises a plurality of data packets, the plurality of data packets are configured to be transmitted through the first TCP connection and the second TCP connection at the same time from the terminal to the network access point device, and the plurality of data packets are configured to be transmitted through the TCP connection from the network access point device to the server.

2. The data transmission method according to claim 1, wherein the transmitting network access data to the network access point device through the MPTCP connection comprises:

selecting a redundant scheduling strategy or an aggregated scheduling strategy based on a type of an application generating the network access data to transmit the network access data to the network access point device, wherein the redundant scheduling strategy is configured to transmit the plurality of data packets through the first TCP connection and transmit the plurality of data packets through the second TCP connection at the same time, the aggregated scheduling strategy is configured to distribute the plurality of data packets to first TCP connection and the second TCP connection for transmitting.

3. The data transmission method according to claim 2, wherein the selecting a redundant scheduling strategy or an aggregated scheduling strategy based on a type of an application generating the network access data to transmit the network access data to the network access point device comprises:

transmitting the network access data to the network access point device by using the redundant scheduling strategy and through the MPTCP connection in response to the network access data being generated by a first type application;

transmitting the network access data to the network access point device by using the aggregated scheduling strategy and through the MPTCP connection in response to the network access data being generated by a second type application;

wherein the first type application has a higher requirement for reliability than the second type application, and the second type application has a higher requirement for a transmission rate than the first type application.

4. The data transmission method according to claim 3, wherein the first type application is a mail application, a payment application, or a mobile banking application, and the second type application is an online video play application, a video live application, or a game application.

5. The data transmission method according to claim 3, wherein the selecting a redundant scheduling strategy or an aggregated scheduling strategy based on a type of an application generating the network access data to transmit the network access data to the network access point device further comprises:

transmitting the network access data to the network access point device through the MPTCP connection under a condition without specifying a scheduling strategy in response to detecting that the network access data is neither generated by the first type application nor generated by the second type application.

6. The data transmission method according to claim 3, wherein the method further comprises:

acquiring a residual power value of the terminal; and wherein the transmitting the network access data to the network access point device by using the redundant scheduling strategy and through the MPTCP connection in response to the network access data being generated by a first type application comprises:

transmitting the network access data to the network access point device by using the redundant scheduling strategy and through the MPTCP connection in response to the network, access data being generated by the first type application and the residual power value being greater than a preset threshold.

7. The data transmission method according to claim 6, wherein the transmitting the network access data to the network access point device by using the redundant scheduling strategy and through the MPTCP connection in response to the network access data being generated by a first type application further comprises:

transmitting the network access data to the network access point device through the first TCP connection or the second TCP connection in response to the residual power value being less than or equal to the preset threshold.

8. The data transmission method according to claim 1, further comprising:

acquiring data transmitted by the server from the network access point device through the MPTCP connection.

9. A data transmission method performed by a network access point device, comprising:

establishing a Multipath Transmission Control Protocol (MPTCP) connection between the network access point device and a terminal, wherein the MPTCP connection comprises a first Transmission Control Protocol (TCP) connection between the terminal and the network access point device and a second TCP connection between the terminal and the network access point device, the first TCP connection is constructed based on a first Wi-Fi connection between the terminal and the network access point device, and the second TCP connection is constructed based on a second Wi-Fi connection between the terminal and the network access point device;

acquiring network access data from the terminal through the MPTCP connection, establishing a TCP connection between the network access point device and a server requested to be accessed by the network access data, and transmitting the network access data to the server through the TCP connection; and acquiring data to be transmitted to the terminal from the server through the TCP connection and transmitting the data to the terminal through the MPTCP connection;

wherein the network access data comprises at least one data flow, each of the at least one data flow comprises a plurality of data packets, the plurality of data packets are configured to be transmitted through the first TCP connection and the second TCP connection at the same time from the terminal to the network access point device, and the plurality of data packets are configured to be transmitted through the TCP connection from the network access point device to the server.

10. A terminal comprising a memory, a processor, a first Wi-Fi module, and a second Wi-Fi module, wherein the processor is configured to call a computer program stored in the memory to execute:

establishing a Multipath Transmission Control Protocol (MPTCP) connection between the terminal and a network access point device, wherein the MPTCP connection comprises a first Transmission Control Protocol (TCP) connection between the terminal and the network access point device and a second TCP connection between the terminal and the network access point device, the first TCP connection is constructed based on a first Wi-Fi connection between the first Wi-Fi module and the network access point device, and the second TCP connection is constructed based on a second Wi-Fi connection between the second Wi-Fi module and the network access point device; and transmitting network access data to the network access point device through the MPTCP connection, and enabling the network access point device to transmit the network access data to a server requested to be accessed through a TCP connection between the network access point device and the server;

wherein the network access data comprises at least one data flow, each of the at least one data flow comprises a plurality of data packets, the plurality of data packets are configured to be transmitted through the first TCP connection and the second TCP connection at the same time from the terminal to the network access point device, and the plurality of data packets are configured to be transmitted through the TCP connection from the network access point device to the server.

11. The terminal according to claim 10, wherein in response to executing the transmitting network access data to the network access point device through the MPTCP connection, the processor executes:

selecting a redundant scheduling strategy or an aggregated scheduling strategy based on a type of an application generating the network access data to transmit the network access data to the network access point device, wherein the redundant scheduling strategy is configured to transmit the plurality of data packets through the first TCP connection and transmit the plurality of data packets through the second TCP connection at the same time, the aggregated scheduling strategy is configured to distribute the plurality of data packets to first TCP connection and the second TCP connection for transmitting.

12. The terminal according to claim 11, wherein in response to executing the selecting a redundant scheduling strategy or an aggregated scheduling strategy based on a type of an application generating the network access data to transmit the network access data to the network access point device, the processor executes:

transmitting the network access data to the network access point device by using the redundant scheduling strategy and through the MPTCP connection in response to the network access data being generated by a first type application;

transmitting the network access data to the network access point device by using the aggregated scheduling strategy and through the MPTCP connection in response to the network access data being generated by a second type application;

wherein the first type application has a higher requirement for reliability than the second type application, and the second type application has a higher requirement for a transmission rate than the first type application.

13. The terminal according to claim 12, wherein in response to executing the selecting a redundant scheduling strategy or an aggregated scheduling strategy based on a type of an application generating the network access data to transmit the network access data to the network access point device, the processor further executes:

transmitting the network access data to the network access point device through the MPTCP connection under a condition without specifying a scheduling strategy in response to detecting that the network access data is neither generated by the first type application nor generated by the second type application.

14. The terminal according to claim 12, wherein the processor further executes:

acquiring a residual power value of the terminal; and transmitting the network access data to the network access point device by using the redundant scheduling strategy and through the MPTCP connection in response to the network access data being generated by the first type application and the residual power value being greater than a preset threshold.

15. The terminal according to claim 14, wherein the processor further executes:

transmitting the network access data to the network access point device through the first TCP connection or the second TCP connection in response to the residual power value being less than or equal to the preset threshold.

16. The terminal according to claim 10, wherein the processor the processor further executes:

acquiring data transmitted by the server from the network access point device through the MPTCP connection.

*   *   *   *   *